Figure 1:
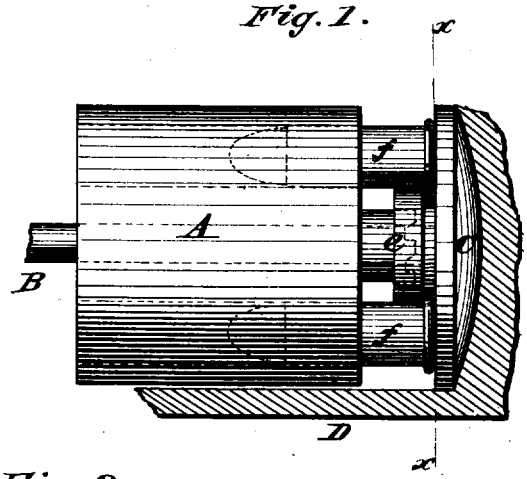

B. H. WILLIAMS.

Revolving Fire Arm.

No. 9,261. Reissued June 15, 1880.

Witnesses:

P. C. Dittmid

Wm. Kupperman

Per

Benjamin H. Williams Inventor

Paul Spencer Attorney

N. PETERS, PHOTO-LITHOGRAPHER, WASHINGTON, D. C.

BEST AVAILABLE COPY

UNITED STATES PATENT OFFICE.

BENJAMIN H. WILLIAMS, OF NEW YORK, N. Y.

REVOLVING FIRE-ARM.

SPECIFICATION forming part of Reissued Letters Patent No. 9,261, dated June 15, 1880.

Original No. 150,120, dated April 21, 1874; Reissue No. 6,569, dated August 3, 1875. Application for reissue filed March 3, 1880.

*To all whom it may concern:*

Be it known that I, BENJAMIN H. WILLIAMS, of the city, county, and State of New York, have invented an Improved Cartridge-Extractor for Revolving Fire-Arms; and I do hereby declare that the following is a full and exact description thereof, reference being had to the accompanying drawings, and to the letters of reference marked thereon.

Previous to my invention numerous devices have been suggested and employed for the purpose of effecting by mechanism the extraction of the empty cartridges in that kind of fire-arms adapted to the use of metallic cartridges, and among such devices have been many designs for use in repeating-arms, or that kind of arms in which a many-chambered revolving cylinder is employed in connection with a single barrel in front of and some suitable recoil shield or plate in rear of said cylinder. In most cartridge-extractors, however, adapted for use in the last-mentioned kind of fire-arms which have been suggested or employed previous to my invention the means employed to effect the extraction of the empty shell have been more or less complicated and liable to derangement and to get out of order.

My invention has for its main objects to provide a means for extracting readily the empty shells in that kind of repeating-arms in which the revolving cylinder is adapted to be removed from the recoil-plate or moved longitudinally forward, which means shall be exceedingly economical and simple of construction or manufacture, durable, and not liable to any derangement, and perfectly positive and efficient in its operation; and to these main ends and objects my invention consists in so forming the rear of the cylinder with a groove or recess and so forming or providing the front of the recoil-shield or face of the lock-frame with a projecting collar adapted to fit into said groove and having a channel in its periphery for the accommodation of the flanges of the cartridges that, when in adjustment for firing, the flanges of the cartridges shall at certain points project beyond the shoulder formed on said collar by said channel, and that when the cylinder shall be pulled off or moved longitudinally forward the said collar shall, by reason of said projection under the flanges of the cartridges, effect the retention toward itself of the said flanges, and consequently the extraction from the chambers of the cylinder of the cartridge-shells.

It also further consists in a new and peculiar extractor combined with a cylinder which is channeled or recessed out at a point or line sufficiently distant from its central axial line to leave a proper quantity of metal or portion of the cylinder that rests upon and surrounds the base-pin to form thereon the ratchet-teeth for rotating the cylinder, and yet permit the extractor-disk to pass over and around said ratchet-teeth portion of the cylinder and take or pass into said channel, leaving the ratchet-teeth exposed to the action of the hand or pawl for rotating the cylinder.

To enable those skilled in the art to make and use my invention, I will proceed to more fully describe the construction and operation of my improved cartridge-extractor, referring by letters to the accompanying drawings, showing one form of my invention, in which—

Figure 2:
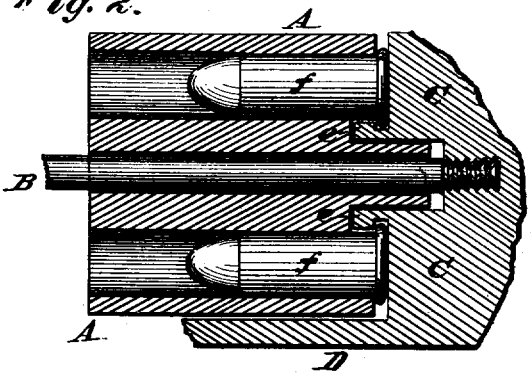
Figure 3:
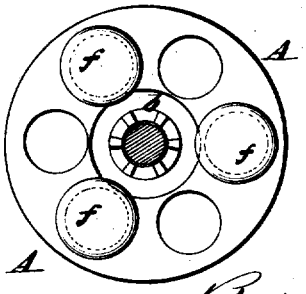

Figure 1 is a partial side view or elevation of a repeating-pistol embracing my invention. Fig. 2 is a longitudinal central section of the same. Fig. 3 is a back view of the cylinder detached.

At Fig. 1 I have illustrated the parts as they would appear while the cylinder was being drawn off of the base-pin and the cartridge-shells extracted.

In the several figures the same part will be found designated by the same letter of reference.

A is the many-chambered revolving cylinder; B, the base-pin or spindle on which the cylinder rotates, and C the recoil-shield or face portion of the frame D of the pistol. This portion C is formed or provided on its front, at *e*, with a projecting collar or short tube, in the outer circumference or periphery of which is turned out a groove or channel, as shown, close to the forward face of the shield-plate C, and so as to form a shoulder, past which project (toward the base-pin B, as illustrated) the flanges of the cartridge cases or shells *f*.

In the rear end of the cylinder A is cut or turned out a recess or groove, *b*, (see Fig. 3,) which, it will be observed, is concentric with the central hole of said cylinder and with its series of cartridge-chambers, and into this recess *b* fits the collar *e* of the recoil-shield piece C, in the manner shown at Fig. 2.

From this construction and combination of parts it follows that when the cylinder A is in place and its chambers filled or loaded with cartridges *f* the flanges of the latter will, at a point nearest the base-pin or center of rotation of said cylinder, project inwardly past or in rear of the collar *e* of the plate C and into the channel or groove formed in collar *e*, this groove being very little wider than the flanges of the cartridges *f* are thick. The parts of said flanges which project into said channel can move round freely therein without hinderance or friction whenever the cylinder A is rotated on the base-pin B; but whenever the cylinder is pulled off of the base-pin or moved longitudinally thereon, as illustrated at Fig. 1, the said projecting portions of the flanges of the cartridges will hang in said channel or catch and hold on against the shoulder or rear edge of the collar *e*, and be detained rearward while the cylinder is being moved forward, and thus the cartridge-shells *f* will be effectually extracted or withdrawn from the chambers of the cylinder A whenever the latter is moved longitudinally forward on the base-pin B.

It will be seen that as the collar *e* corresponds in external size and shape to the groove *b*, and takes bearings upon both the larger and smaller circumferences of said groove, the walls of the chambers of the cylinder are not practically weakened by the presence of said groove *b*, said groove being always blocked up with the collar *e* at the time when the cartridges in the chambers are being discharged of their contents.

It will also be seen that since the collar *e*, by which the extraction of the empty shells is effected whenever the cylinder is moved forward, is a solid fixture, and is larger in external diameter than the circle in which lie the innermost points of the series of cartridge-flanges, its efficiency as an extractor is infallible, because none of the flanges of the cartridges can possibly ride over and fail to be caught upon the shoulder or catching portion of said collar.

Where any sort of spring device or yielding catch-surface is employed this unfailing efficiency of action is not secured, since by the failure to go home perfectly to its proper seat or location in the recess of the cylinder, or by the riding over it of the flanges of the cartridges, such yielding catch-surface, finger, or other extracting device is liable to fail in its intended office or action.

In carrying out my invention, the gist of which lies in the idea of a projecting collar or fixture adapted to enter behind or under the flanges of the cartridges, it is, of course, immaterial what size or diameter be adapted for said collar, and whether the collar *e* be made, as shown, with a channel in its periphery to accommodate the portions of the flanges nearest to the base-pin, or be made to surround the flanges of the cartridges and with a channel in its internal surface to accommodate those portions of the flanges most distant from the axis of motion of the cylinder.

I have represented the collar *e* as being formed on or out of the stock of the plate C; but this detail of construction or manufacture may, of course, be varied, like others, and if deemed expedient said collar may be made of a separate piece and permanently secured in place by attachment either to said plate C or to the base-pin of the pistol; and this also applies to the formation of that part of the cylinder on which is formed the ratchet-teeth for rotation.

Having so fully described my invention that any one skilled in the art can make and use it, what I claim as new, and desire to secure by Letters Patent, is—

1. The combination, with a removable cylinder having a suitable recess or groove for its reception, of a fixed continuous collar or extractor and rotating mechanism, as described, the whole arranged to operate substantially in the manner and for the purpose set forth.

2. A longitudinally-movable revolving cylinder combined with a fixed continuous extractor extending forward of the recoil-plate and behind or under the flanges of the cartridges, substantially as described.

3. A many-chambered revolving cylinder for a fire-arm, recessed or channeled out at its rear end, around that portion of the cylinder on which is formed the ratchet-teeth, and which portion is circumjacent to the base-pin hole or axis of motion of the cylinder, in combination with a fixed extractor formed to pass over said circumjacent portion and enter the channeled portion thereof, all constructed, arranged, and operated substantially as shown and described.

BENJAMIN H. WILLIAMS.

Witnesses:
WM. A. HULBERT,
MILAN HULBERT.